United States Patent [19]
Grove et al.

[11] 3,720,044
[45] March 13, 1973

[54] STRENGTH COMPOUNDING CAPILLARY ARRAY

[75] Inventors: Robert K. Grove, Los Altos; Richard O. Sloma, Cupertino, both of Calif.

[73] Assignee: Lockheed Aircraft Corporation, Burbank, Calif.

[22] Filed: Jan. 4, 1971

[21] Appl. No.: 103,742

[52] U.S. Cl. ..........................53/159, 55/466, 55/525
[51] Int. Cl. ..............................................B01d 19/00
[58] Field of Search.........55/159, 193, 525, 485, 466; 210/499, 489, 492; 60/39.48

[56] References Cited

UNITED STATES PATENTS

| | | | |
|---|---|---|---|
| 2,420,356 | 5/1947 | Compa | 55/193 X |
| 3,057,481 | 10/1962 | Pall | 210/499 X |
| 3,486,302 | 12/1969 | Panntea | 55/159 |
| 3,492,793 | 2/1970 | Bhuta et al. | 55/159 |

OTHER PUBLICATIONS

Capillary Systems for Storable Propellants – Martin Mariethor Corp. Section Report 1660-67-8, June, 1967, pages 3-14, 21 and 30.

*Primary Examiner*—John Adee
*Attorney*—Paul F. Morgan and George C. Sullivan

[57] ABSTRACT

A strength compounding capillary array for liquid management systems such as liquid-gas separators. Multiplication of the capillary liquid retention force available from a single capillary element and/or an increase in capillary aperture dimensions for improved liquid flow is provided. A plurality of peripherally enclosed self-wicking and self-sealing capillary elements are held in a serial spaced apart relationship. The spacing may be provided by stacking the capillary elements interleaved with non-self-sealing elements. The closed liquid films at each capillary element maintain an additive series of closed gas retaining compartments between the elements during the absence of liquid therein.

5 Claims, 4 Drawing Figures

ROBERT K. GROVE
RICHARD O. SLOMA
*INVENTORS.*

BY George C. Sullivan Agent

Paul F. Morgan Attorney

STRENGTH COMPOUNDING CAPILLARY ARRAY

The present invention relates to liquid management systems, and more particularly to an arrangement for multiplying the capillary force available in a capillary device.

Numerous capillary arrangements have been utilized in the prior art for various liquid management systems. Some examples of such arrangements are described in U.S. Pats. Nos. 3,225,524; 3,300,949; 3,303,634; 3,309,843; 3,353,350 (by the present inventor, R. K. Grove, and others); 3,486,302 and 3,492,793. These systems, although some have several elements, provide only the capillary force of a single capillary element. Therefore they must utilize relatively very small aperture capillary elements, such as relatively small pore sponges, screens, etc., to achieve a high degree of capillary liquid control.

In contrast, the liquid management system of the invention provides a much higher degree of capillary liquid control yet can utilize much larger capillary apertures, thereby providing improved liquid flow rates, reduced screen corrosion, reduced screen blockage by contaminants and structurally stronger screens. Liquids can be retained against much higher gas pressures, gravitational heads and acceleration forces in numerous applications with a simple purely capillary structure providing uninterrupted liquid flow therethrough. The system of the invention is completely passive, has no moving parts and can have an unlimited operating life. The available capillary force can be multiplied almost indefinitely to perform functions not previously possible with capillary systems.

Further objects, features and advantages of the invention pertain to the particular arrangement and structure whereby the above-mentioned aspects of the invention are attained. The invention will be better understood by reference to the following description and to the drawings forming a part thereof, wherein.

Figure 1:
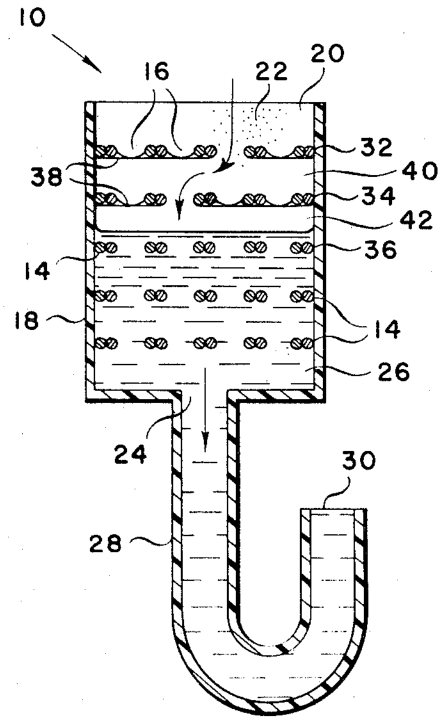
FIG. 1 is an axial cross-sectional view of an exemplary liquid management system in accordance with the present invention, shown in a condition of liquid flow therethrough with a first capillary force head.
Figure 2:
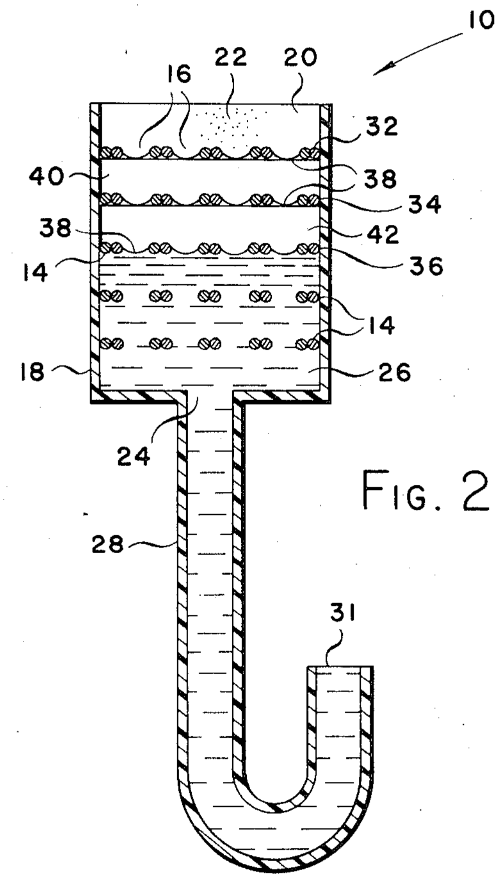
FIG. 2 shows the liquid management system of FIG. 1 in a static equilibrium (no flow) condition with a second and greater capillary force head.

Referring first to FIGS. 1 and 2, there is shown therein an exemplary liquid management system 10 in accordance with the present invention. A serial array of spaced capillary elements 14 is provided. Each capillary element 14 is uniform dimension capillary apertures 16 providing for relatively unobstructed liquid flow through all the capillary elements 14 in cascade.

The capillary elements 14 are all peripherally enclosed by a fluid tight enclosure defining a conduit 18. The conduit 18 here is shown with only an inlet opening 20 exposed to a gas atmosphere 22, and an outlet opening 24 holding a level of a gas-free liquid 26. For illustration of the capillary force multiplying operation of the system a variable level draft tube 28 is shown as an extension of the conduit 18.

Each of the capillary elements 14 extends completely across the conduit 18 interior and is individually self-wicking and self-sealing to maintain a separate closed liquid film 38 in the element in the absence of liquid. In FIG. 1 the liquid level 30 in the conduit 18 is being lowered by drawing off the liquid 26 from the outlet 24. The first two capillary elements 32 and 34 are exposed to the gas 22, while the third element 36 is still entirely submerged in the liquid 26. Accordingly, the elements 32 and 34 have automatically formed closed liquid films 38 across all of their capillary apertures 16. The only openings in the films 38 are those temporarily forced open by gas flow as will be later explained. In a static equilibrium condition as in FIG. 2 there are no openings. The liquid for these films 38 is the liquid which is retained and distributed by the self-wicking structure of the capillary elements.

The capillary elements 14 illustrated here are dutch weave wire mesh screens, as their good self-wicking characteristics (provided by their adjacent wire pairs) are well known in the art. Other known or suitable self-wicking and self-sealing capillary elements may also be utilized. The screens shown all have the same mesh (aperture 16 dimensions) although this is not essential. The screens may be made from aluminum, stainless steel or any other material suitable for the particular selected environment.

The capillary elements should be separated in a manner which results in the wicking capability of this separation region being weak relative to that within the capillary elements themselves. If the wicking capability in the separation region is substantial relative to that of the capillary elements themselves, then, over a time period, the liquid films 38 will be drawn off from the lowest pressure exposed capillary elements and they will begin to fail (open). Accordingly, the capillary elements 14 are separated sufficiently to prevent substantial capillary flow between the liquid films 38 on adjacent capillary elements. Thus, the capillary elements are preferably continuously spaced apart by a minimum distance greater than the dimensions of the capillary apertures 16. Where a spacing element other than a simple gas space is utilized (which adds a capillary effect) then this minimum spacing will be increased. There is no maximum spacing limitation, and the elements may be substantially spaced apart as long as they are all in the same closed conduit system. For example, some capillary elements may be at an entrance to a gallery arm at one end of a tank but in series with other elements in a connected sump at the opposite end of the tank.

The separation regions between the capillary elements 14, which are peripherally enclosed as discussed above, provide a series of separate gas retaining compartments during the absence of liquid therein, due to the closed liquid films 38. Two such compartments 40 and 42 are shown in FIGS. 1 and 2. As the liquid 26 is withdrawn and displaced by the gas 22, additional new gas retaining compartments are formed in each inter-capillary element space. These compartments provide a capillary strength compounding effect by adding together the capillary forms available at each in individual exposed capillary element. They are separate compartments, and there is no capillary path between the separate capillary elements.

Referring first to FIG. 1, where the system 10 is subjected to a sufficient pressure differential to draw liquid therefrom, it may be seen that the liquid films 38 in the exposed capillary elements 32 and 34 are overloaded; i.e., the pressure drop across them is sufficient for gas to bubble through the liquid film 38 through a few of the weaker (slightly) capillary apertures, as shown by the arrows. However, each liquid film 38 only opens just enough to cause the pressure change due to the gas influx into the compartments 40 and 42 to just equal the capillary pressure capability of each capillary element. Only enough gas bubbles through to satisfy the flow requirements and keep the pressure drop constant. Thus, the gas pressure in compartment 40 is constantly equal to the inlet 20 gas pressure minus the capillary pressure capability of the first capillary element 32. But the gas pressure in compartment 42 (and thus the head it is capable of supporting) is constantly the gas pressure in compartment 40 minus the additional capillary pressure capability of the second capillary element 34. Thus, each added capillary film 38 adds an additional gas pressure component.

As additional liquid is withdrawn, so that additional capillary elements must be overloaded, the liquid level or head which the array will hold is increased. This is illustrated by the difference between the liquid level 30 of FIG. 1 and the liquid level 31 of FIG. 2. FIG. 2 shows the system 10 in a static equilibrium condition, supporting a greater pressure head than FIG. 1, since the third capillary element 36 is exposed there and further flow would require overloading the capillary force of the liquid film on the third element 36 in addition to those of the first and second elements 32 and 34. In equilibrium the sum of the individual pressure losses across each exposed element, plus the capillary pressure capability of the next element in series (not yet overcome), equals the total pressure differential to which the system is subjected. At that point the holes in all elements reseal, gas penetration into the array is stopped, and the system can exist indefinitely in static equilibrium.

No gas penetration through the total array is possible. As liquid is withdrawn, liquid is removed only in series sequence from each space between elements; i.e., gas enters each succeeding compartment 40, 42, etc., only after all liquid has been removed from the preceding compartment. The liquid-gas separation effect across each element is additive, since all fluid flow is required to pass through all of the individual elements in series. The array is contained by the smooth walls of the conduit 18 to prevent by-passing of either the total or individual stages.

It will be noted that the system 10 functions as described whether exposed to gas from either or both sides, and for either direction of fluid flow. Also while the system 10 is illustrated here oriented vertically, it will operate in any position.

From the above-described operation of the system 10, it may be seen that with a multiplicity of said systems 10 commonly manifolded in parallel with one another and located at different places in a tank filled partially with liquid and partially with gas, that gas-free liquid may be withdrawn via the manifold from the tank regardless of the position of the liquid in the tank, providing any one or more of the inlets 20 are at least partially immersed in the liquid. Influx of the gas into the manifold will be prevented, even though other inlets 20 on the manifold are exposed to the gas.

The number of capillary elements required for a given array is determined simply by selecting a suitable capillary element, determining its individual capillary retention force and dividing that figure into the desired maximum retention force (the total head required). An array of several large mesh screens can replace an existing fine mesh screen yet provide the same capillary effect, with reduced liquid flow pressure drop and increased strength and corrosion resistance. For example, a forty stage array of capillary elements with 0.0025 inch apertures has the same liquid retention force as a single very fine capillary element with 0.00006 apertures. The later single capillary element would be much more subject to corrosion and damage and would be difficult to manufacture. The smaller apertures would trap a much wider range of fine contaminants and thus be much more subject to clogging, especially as there are typically relatively more contaminants in the smaller particle dimensions.

Figures 3, 4:
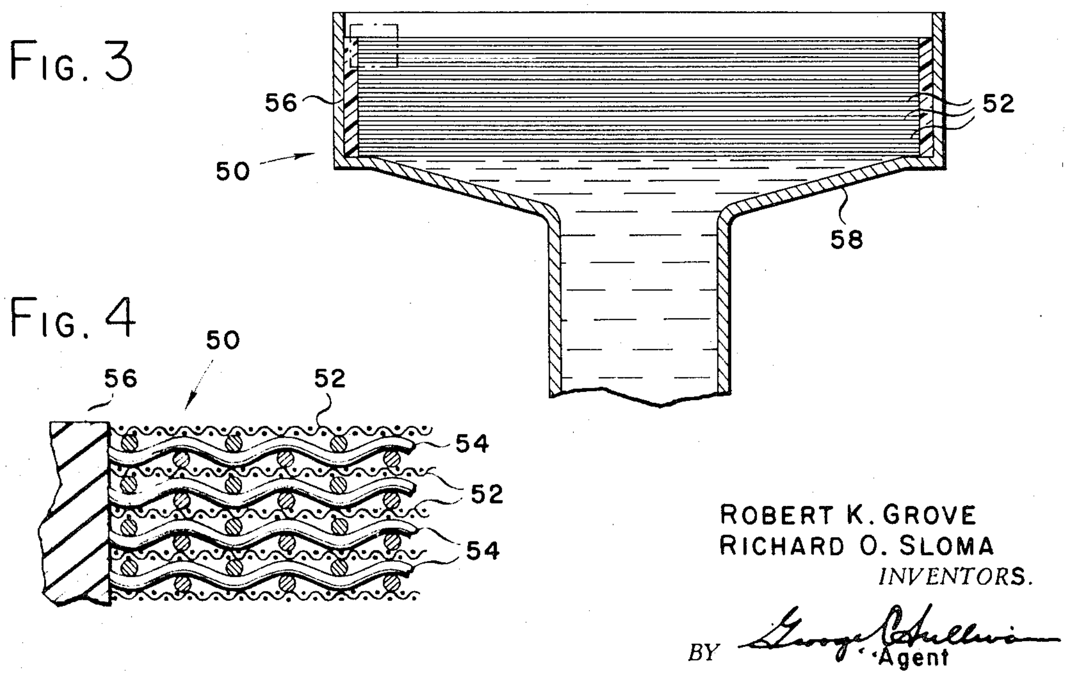
FIG. 3 shows an alternative embodiment of the liquid management system of FIGS. 1 and 2 in axial cross-section.
FIG. 4 is a magnified view of a small portion of FIG. 3.

Turning now to FIGS. 3 and 4, there is shown another embodiment of the present invention. (FIG. 4 is a magnified portion of FIG. 3 indicated by the dotted outline in FIG. 3) This is a liquid management system 50 having the same basic structure, advantages and principles of operation as the liquid management system 10 of FIGS. 1 and 2. It has a multiplicity of thin capillary elements 52 stacked in a more compact, but still spaced, array. The spacing between the capillary elements 52 is provided here by stacking the elements 52 together with spacers 54 of substantially the same lateral dimensions interleaved therebetween. The spacers 54 are freely liquid communicating and are thick enough to provide a spacing between capillary elements substantially larger than the apertures in the capillary elements 52.

As illustrated here, the spacers 54 may be regular mesh screens, and the array may be formed by directly abutting the spacers between the capillary elements. This provides good structural integrity and uniform spacing in a compact structure. This arrangement also has the feature that all of the capillary elements may, if desired, be kept wetted by wicking through the entire compressed stack. This is advantageous where the system is in an environment where the exposed capillary elements are subjected to evaporation of the liquid film thereon (an example is where the liquid is warmer than the container). However, as discussed above, this inter-capillary wicking must be kept at a low order relative to the internal wicking of the capillary elements if the system is to have a long term retention capability under loading. One way to prevent this long term leakage effect is to stop the spacers 54 short of the peripheral seal 56. This eliminates inter-capillary wicking at the peripheral interface.

The spacing between capillary elements 52 can also be provided by weaving larger diameter wire into and out of the capillary screen itself, as long as the capillary integrity is maintained. The projecting loops of the larger diameter wire then serve the same function as the spacers 54. Various other spacing arrangements may also be employed.

The peripheral sealing of the overall array and the intercapillary element spaces may be provided by sealing the edges of the entire stack in an annular seal 56 of plastic, rubber, glue, metal spray or the like. The seal 56 acts as the conduit 18 of FIGS. 1 and 2. The seal 56 is here also seated within a protective housing 58 providing the outlet connection.

It may be seen that there has been described herein an improved but simple liquid management system which can provide greatly increased capillary retention forces. The apparatus described herein is presently considered to be preferred. However, further variations and modifications with the purview of those skilled in the art may be made herein and the following claims are intended to cover all such variations and modifications as fall within the true spirit and scope of the invention.

What is claimed is:

1. A liquid management system comprising:

a plurality of separate capillary elements, each having a multiplicity of capillary apertures therethrough, said capillary elements being arranged in a serial array for sequential liquid flow therethrough, said capillary elements are separated from one another by a distance greater than the dimensions of said capillary apertures, each said capillary elements being self-wicking and self-sealing to maintain a closed liquid film thereacross during the absence of liquid in said spaces, and wherein said capillary elements are dutch weave mesh screens, sealing means for peripherally enclosing said spaces between said capillary elements so that said spaces provide with said closed liquid films a sequential additive series of gas retaining compartments during any absence of liquid therein, and wherein said spaces between said capillary elements are provided by stacking said capillary elements together with liquid communicating spacers interleaves therebetween of a thickness greater than said capillary apertures in said capillary elements, thereby providing a capillary strength compounding array.

2. A liquid management system comprising:

a plurality of separate capillary elements, each having a multiplicity of capillary apertures therethrough, said capillary elements being arranged in a serial array for sequential liquid flow therethrough, said capillary elements being separated from one another by a distance greater than the dimensions of said capillary apertures to define relatively non-capillary spaces therebetween, wherein said capillary elements are dutch weave mesh screens, and wherein said spaces between said capillary elements are provided by stacking said capillary elements together with liquid communicating spacers interleaved therebetween, each said capillary element being self-wicking and self-sealing to maintain a closed liquid film thereacross during the absence of liquid in said spaces, and sealing means for peripherally enclosing said spaces between said capillary elements so that said spaces provide with said closed liquid films a sequential additive series of gas retaining compartments during any absence of liquid therein, thereby providing a capillary strength compounding array.

3. The liquid management system of claim 2 wherein said spacers are mesh screens.

4. A liquid management system comprising:

a closed conduit with an inlet opening and an outlet opening, a plurality of separate thin capillary elements in said conduit, each said capillary element extending completely across the interior of said conduit, said capillary elements being arranged in series along said conduit between said inlet opening and said outlet opening for the sequential flow of all fluid flowing through said conduit through all of said capillary elements, said capillary elements being separated from one another along said conduit to define a plurality of separate spaces between said capillary elements peripherally enclosed by said conduit, said spaces between said capillary elements are provided by stacking said capillary elements together with liquid communicating spacers interleaved therebetween, said spacers having a thickness greater than said capillary apertures in said capillary elements, said capillary elements being self-wicking and self-sealing to each maintain a separate closed liquid film across the interior of said conduit during the absence of liquid in said spaces, said spaces providing with said closed liquid films a sequential additive series of gas retaining compartment during the absence of liquid therein, thereby providing a capillary strength compounding array between said inlet opening and said outlet opening.

5. A liquid management system comprising:

a closed circuit with an inlet opening and an outlet opening, a plurality of separate thin capillary elements in said conduit, each said capillary element extending completely across the interior of said conduit, said capillary elements being arranged in series along said conduit between said inlet opening and said outlet opening for the sequential flow of all fluid flowing through said conduit through all of said capillary elements, said capillary elements being separated from one another along said conduit to define a plurality of separate spaces between said capillary elements peripherally enclosed by said conduit, said spaces between said capillary elements are provided by stacking said capillary elements together with liquid communicating spacers interleaved therebetween, said spacers comprising mesh screens having a thickness greater than said capillary apertures in said capillary elements, said capillary elements being self-wicking and self-sealing to each maintain a separate closed liquid film across the interior of said conduit during the absence of liquid in said spaces, said spaces providing with said closed liquid films a sequential additive series of gas retaining compartment during the absence of liquid therein, thereby providing a capillary strength compounding array between said inlet opening and said outlet opening.

* * * * *